United States Patent [19]

Belokin, Jr.

[11] 4,324,340
[45] Apr. 13, 1982

[54] ALUMINUM CAN WITH COLLAPSIBLE SIDEWALL

[76] Inventor: Paul Belokin, Jr., Rte. 4, Hayward, Wis. 54843

[21] Appl. No.: 123,990

[22] Filed: Feb. 25, 1980

[51] Int. Cl.³ .......................... B65D 1/40; B65D 8/04
[52] U.S. Cl. .................................... 220/1 R; 215/1 C
[58] Field of Search ...................... 220/1 R, 1 BC, 72; 150/0.5; 215/1 C; 222/97, 102, 215; 229/41 R, 4.5

[56] References Cited

U.S. PATENT DOCUMENTS

| | | |
|---|---|---|
| 1,517,857 | 2/1927 | Mallory . |
| 2,139,143 | 12/1938 | Wiswell . |
| 3,089,533 | 5/1963 | Stachbery et al. . |
| 3,162,371 | 12/1964 | Palmer et al. . |
| 3,259,091 | 7/1966 | Campbell . |
| 3,353,700 | 11/1967 | Kalina .............................. 220/1 R |
| 3,401,826 | 9/1968 | Anthony . |
| 3,472,418 | 10/1969 | Ullman . |
| 3,872,994 | 3/1975 | Hyde .............................. 220/1 R |
| 3,918,603 | 11/1975 | Hatada .............................. 220/1 R |

Primary Examiner—George E. Lowrance

Attorney, Agent, or Firm—Wegner, Stellman, McCord, Wood & Dalton

[57] ABSTRACT

A seamless aluminum container of the type used for beer, soft drinks, edible goods or the like is provided which container is adapted to be manually axially collapsed to a smaller size when its contents are exhausted, the container collapse being accomplished without the need of any apparatus for guiding the container sidewall collapse and without the aid of any mechanical or fluid pressure device. The container sidewall is shaped to provide a number of similar annuli each of concave axial cross section, adjacent annuli being separated by a peripheral, outwardly angled ridge. Manual axial forces collapse adjacent about an interposed ridge to form a collapsed container approximately one-fifth the size of the original container. The device encourages consumers to recycle aluminum, facilitates the storage and transport of aluminum cans to a recycling station, strengthens aluminum cans in a transverse direction permitting thinner aluminum stock to be used, and conserves aluminum and the energy needed to produce aluminum.

21 Claims, 11 Drawing Figures

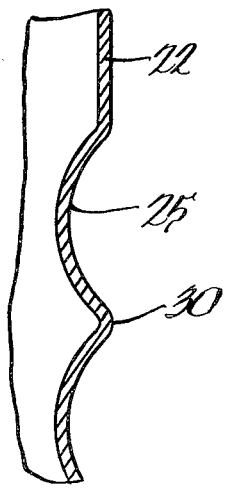
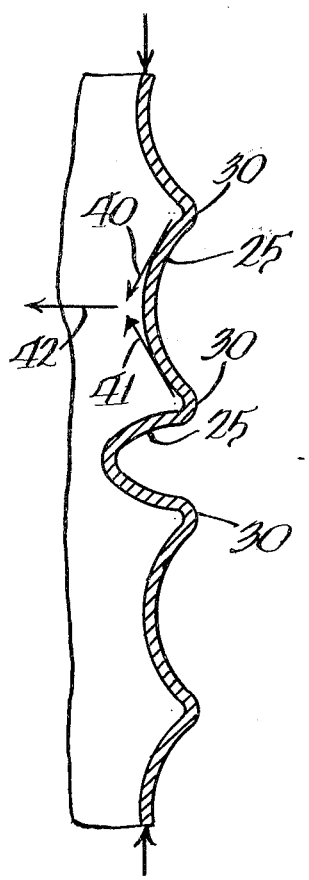
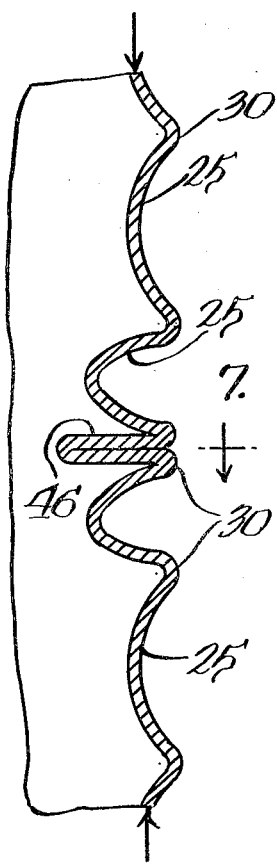
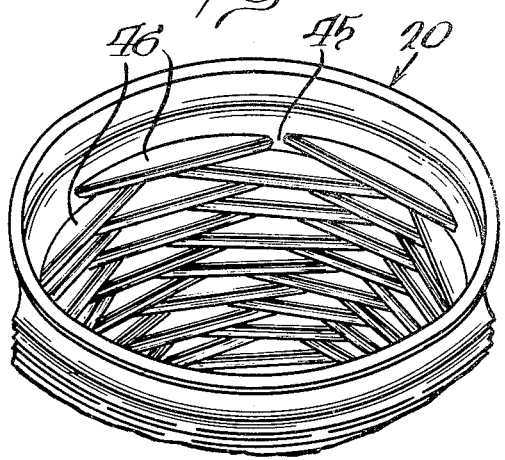
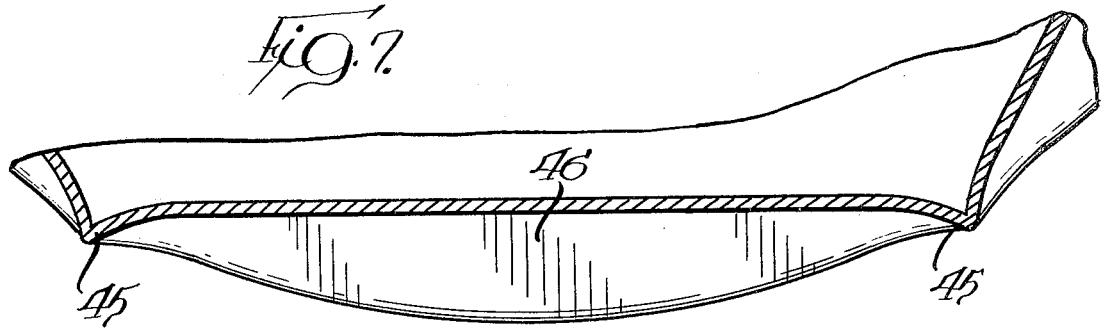

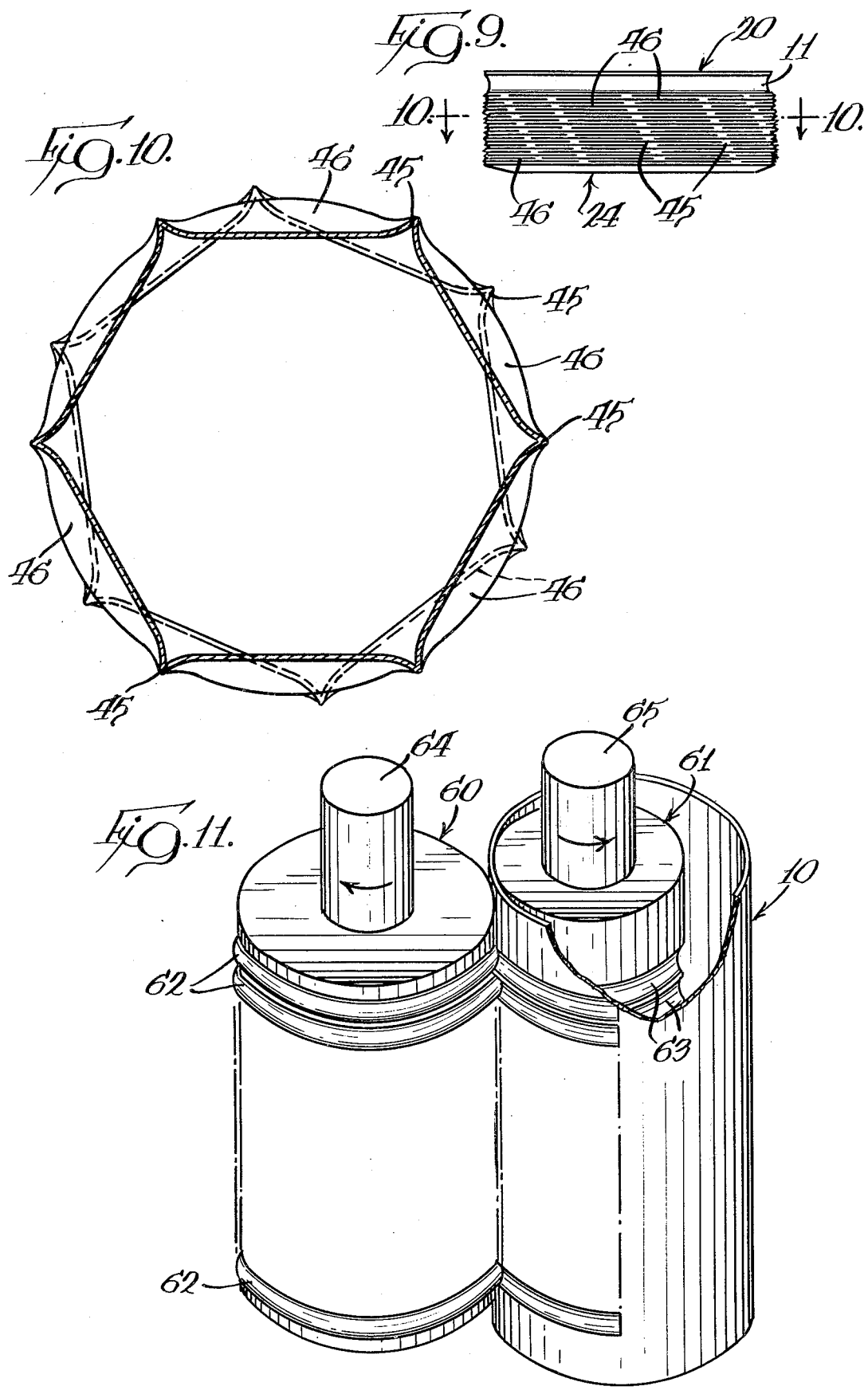

ALUMINUM CAN WITH COLLAPSIBLE SIDEWALL

BACKGROUND OF THE INVENTION

1. Field of the Invention

This invention relates to a collapsible seamless aluminum container of the type used for beer, soft drinks, or the like, and more particularly to a container whose annular sidewall can be manually axially collapsed when the container contents are exhausted.

2. Description of the Prior Art

Metal containers of the prior art have been provided with ribs in the container lateral surface extending both horizontally and longitudinally. However, such ribs have been positioned, constructed and arranged to effect only a strengthening function of the lateral surface or sidewall of the metal container. Similarly, metal container sidewalls have also been provided with embossments of varying shapes, but these deformations are generally again only for the purpose of increasing the strength of the container sidewall. Applicant is not aware of any prior art seamless aluminum can or container for accommodating beverages or other goods which is formed of sufficient strength for its intended purpose, and yet can be axially collapsed by manual pressure when exhausted of its contents so that the container will occupy a minimum of space.

In the patent prior art, U.S. Pat. No. 3,401,826 shows a packaging system in which vertical corrugations, horizontal corrugations and diamond-shaped embossments are used to strengthen the sidewalls of a package or container to be formed. The patent discloses light-gauge material which is initially formed in the shape of a flattened tube for shipping purposes, and then containers formed from the tube are expanded, provided with a bottom closure member, filled with the desired contents, and provided with an appropriate cover or lid. No structure is provided in the sidewalls to facilitate axial collapsibility of the container after the contents of the container are removed; in fact, the deformations in the sidewall of the container are stated to be for strengthening the sidewalls.

U.S. Pat. No. 3,472,418 shows annular corrugations in the sidewall of a large drum, which corrugations again are for strengthening the sidewalls.

U.S. Pat. No. 3,089,533 relates primarily to an apparatus for beading thin metal cylinders by passing a ribbed mandrel over the lateral surface of the cylindrical body. Both horizontal and vertical ribs are shown in the lateral surface of the container and the purpose of the ribs is to strengthen the lateral surface of the cylindrical body. The lateral surface is not intended to be axially collapsible.

Prior art U.S. Pat. No. 2,139,143 discloses expressor mechanisms or collapsible devices for dispensing liquids and semi-liquids from sealed containers by applying mechanical screw pressure or pneumatic pressure endwise of the sealed containers to squeeze the container into a collapsed condition so as to empty the contents of the container. In two of the devices which apply rotative screw pressure, the opposite ends of the container being collapsed are rotated relative to each other so that the container walls are collapsed in a spiral fashion. The pneumatic pressure device has a cylinder within which a piston reciprocates to squeeze a container in the cylinder against a stationary head. The container disclosed by the patent is provided with spaced creases which extend intermittently and diagonally or spirally around the lateral surface of the container. Intermittent horizontal creases spaced axially of the container are also diagrammatically shown.

SUMMARY OF THE INVENTION

Billions of aluminum cans or containers are manufactured and used in the United States each year, and their use is increasing for beverages and other goods for human consumption. Particularly with beverages, cans made from aluminum provide greater palatability than other metal containers.

The common practice is simply to throw the cans away after use which is wasteful of valuable aluminum materials. A large portion of our aluminum ore (bauxite) is imported which adversely affects our foreign monetary balance of payments. More importantly, the conversion of aluminum ore to aluminum metal requires large amounts of electrical energy, the industry being extremely energy oriented and energy intensive. Aluminum metal which is saved, recycled and reused thus conserves both valuable materials and increasingly valuable supplies of energy. Therefore, consumers purchasing goods in aluminum cans must be encouraged to save the cans, to store the cans, and to transport the cans to a central collection agency, which in turn will store and have the cans transported to a recycling center.

One of the principal deterrents in establishing an effective recycling operation is the inconvenience of storing and transporting the space-consuming cans in their cylindrical condition. Space is consumed within the chambers of the cans and between adjacent cans, again both in storage and in transport.

The present invention enables a consumer to manually axially collapse an aluminum can to about one-fifth its normal size, substantially obviating the deterrent referred to above. Conservationists advocating aluminum recycling are also advocating some small payment for each can returned for recycling. The present invention will give added impetus to this needed conservation measure by encouraging the consumer to participate in the recycling operation and by facilitating the handling of the cans by all persons involved in the recycling operation.

It is the principal object of the present invention to provide a seamless aluminum container for beverages, edible goods, or the like, which is adapted to be axially collapsed by manual pressure without using any guiding surfaces adjacent the peripheral sidewalls of the container.

Another object of the invention is to provide a readily collapsible can or container which can be collapsed by applying manual pressure from the foot of an individual with the can resting on a supporting surface.

A further object of the invention is to encourage the conservation of aluminum, and its concomitant energy processing requirements, by facilitating aluminum recycling.

A further object of the invention is to provide a collapsible can for beverages or the like having alternate rows of concave annuli and of rib means or ridges formed peripherally in the sidewall to strengthen the sidewall of the can in a direction transverse of the axis of the can so that the sidewall of the can may be formed of thinner aluminum stock.

Still another object of the invention is to provide a plurality of concave annuli in the lateral surface of the collapsible can to facilitate the grasping of the can by the hand of an individual utilizing the contents of the can, and to increase the available sidewall surface area for cooling purposes.

Yet another object is to provide a collapsible can of a structure which can be easily manufactured by well-known processes with a minimum of changes in machinery currently available.

It is estimated that about one aluminum can in four or five is now being returned for a recycling operation, even though many manufacturers of products utilizing aluminum cans encourage the consumer by stating on each can "All aluminum Please recycle". It is an important purpose of the present invention to provide an easily and readily collapsible aluminum can which will encourage the recycling of aluminum cans by economizing on storage and transporting space required from the consumer to the aluminum recycling station.

In an exemplary embodiment of the invention, a seamless aluminum container is provided which is adapted to be axially collapsed after the contents of the container have been removed. The container has a seamless sidewall of thin bendable aluminum shaped generally in the form of a right circular cylinder. The container is closed at the bottom and is provided with a top closure member which may be provided with a manually removable tab as currently in common use on beverage cans or with some similar access means to the inner chamber of the can. A plurality of adjacent similarly shaped concave annuli are impressed into the lateral surface of the can which provide annular rib means or ridges in the can sidewall directed outwardly between adjacent rows of annuli.

When an empty can is placed uprightly on a supporting surface, axial pressure on the can by the foot of an individual will collapse the sidewall. The sidewall folds circumferentially at each annular rib and the resultant of forces on each concave annulus folds each annulus inwardly to form an annular series of flattened chord-like plates or segments extending between apexes located at a position of weakening in each annulus. Each apex is forced outwardly as the segments are formed so that each series of segments of a collapsed annulus lies generally in a polygonal shape.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 4 is an enlarged sectional view taken as indicated on line 4—4 of FIG. 2;

FIG. 5 is an enlarged sectional view similar to FIG. 4 and illustrating the initial folding action of an annulus between adjacent annular ridges, the annulus beginning to be deformed inwardly by the forces at opposite ends of the sidewall, as indicated by the opposing arrows;

FIG. 6 is a view similar to FIG. 5 and showing continued application of opposing forces, as indicated by the arrows, to form a flattened segment or chord-like plate in one annulus and the initial deformation in adjacent annuli.

FIG. 7 is a sectional view taken as indicated on line 7—7 of FIG. 6 and showing the general shape of the bottom portion of a flattened segment or chord-like plate in fully folded position together with the deformation outwardly of the apex portions between adjacent segments.

FIG. 8 is a fragmentary perspective view of the inside of the container of FIG. 2 showing the general configuration of the chord-like plates or segments being formed when the can of FIG. 2 is collapsed to one-half the height shown in FIG. 2, the partially collapsed segments in each series of a collapsing annulus being heterogeneously positioned.

FIG. 9 is a side elevational view of the can in FIG. 2 in fully collapsed position, the height being about one-fifth the height of the can in FIG. 2 and the apex portions of each series of flattened segments being heterogeneously positioned with respect to the apex portions of adjacent segments.

FIG. 10 is an enlarged sectional view taken as indicated on line 10—10 of FIG. 9 to illustrate two series of flattened segments, the segments in dotted outline being approximately the fifth series of segments beneath the segments shown in full line; and FIG. 11 is a diagrammatic showing of a pair of cooperating dies, each in mandrel form, for forming the rows of annuli and ridges in the lateral surface of a seamless aluminum can.

DESCRIPTION OF THE PREFERRED EMBODIMENT

Conservation of energy and conservation of raw materials are increasingly important objectives in today's economy. Current television advertisements emphasize the need for recycling aluminum cans and show prior art cans as in FIG. 1, generally designated 10, being carried by the truckload toward a recycling station.

Figure 1:
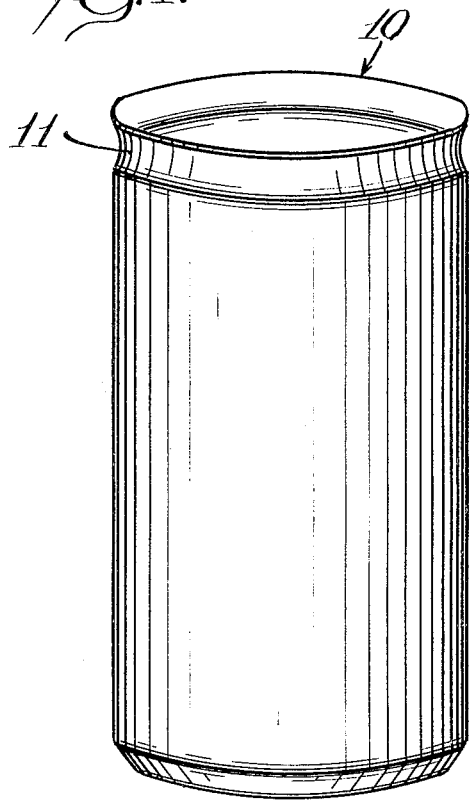
FIG. 1 is an upright perspective view of a seamless aluminum can, with the top removed, exemplifying the type of prior art can currently available in the marketplace.

The collapsible can of the present invention will utilize and require less than one-fifth the space of the can of FIG. 1. The collapsible container is constructed and arranged to easily be placed in collapsed condition, as in FIG. 9, by a consumer after the contents are extracted from the container. Manual foot pressure of a consumer applied axially of the can of FIG. 2 will collapse the peripheral sidewalls, as shown in FIGS. 8, 9 and 10, without the need of any apparatus for guiding the sidewall collapse and without the aid of a mechanical or fluid pressure device.

Can 10 is generally formed by an extrusion process from aluminum, a popular size having a height of about 4.75 inches and a diameter of about 2.50 inches. The annular sidewall is generally formed to a thickness of 0.0050 inches to 0.0065 inches. In extruding, the sidewall and the bottom closure member are integrally formed. In FIG. 11, the can 10 of FIG. 1 (absent the neck portion 11) is shown being formed into the structure of FIG. 2. In the structure of the present invention, aluminum stock of a thickness of 0.0040 inches may be used.

Figure 2:
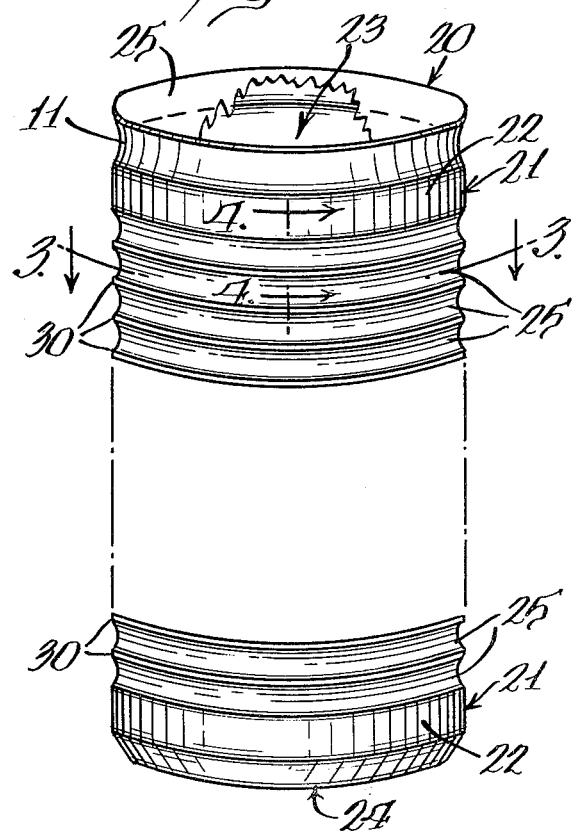
FIG. 2 is an upright perspective view of a seamless aluminum can, with the top closure member broken away, showing the annuli and interposed ridges formed in the lateral surface of the sidewall of the can, it being understood that the rows of annuli extend annularly about the can and in like manner in the space between the upper and lower rows of annuli shown.

Referring to FIG. 2, a seamless aluminum container, generally designated 20, is provided with a peripheral sidewall 21 formed in seamless fashion of thin sheet aluminum. The endless peripheral sidewall 21 affords an outer lateral surface 22 which is preferably generally shaped in the form of a right circular cylinder forming an inner chamber 23, the chamber enclosed by a bottom closure member 24 and a top closure member 26. The top closure member is secured to the upper part of the endless sidewall in a conventional manner and the top closure member may be provided with a removable tab or other access means, not shown, to provide access to the inner chamber 23 and to the contents of the container. While the container 20 shown here is in the shape of a right circular cylinder, it is understood that other forms of cylinder of annular cross section may be used within the scope of the present invention.

Figure 3:
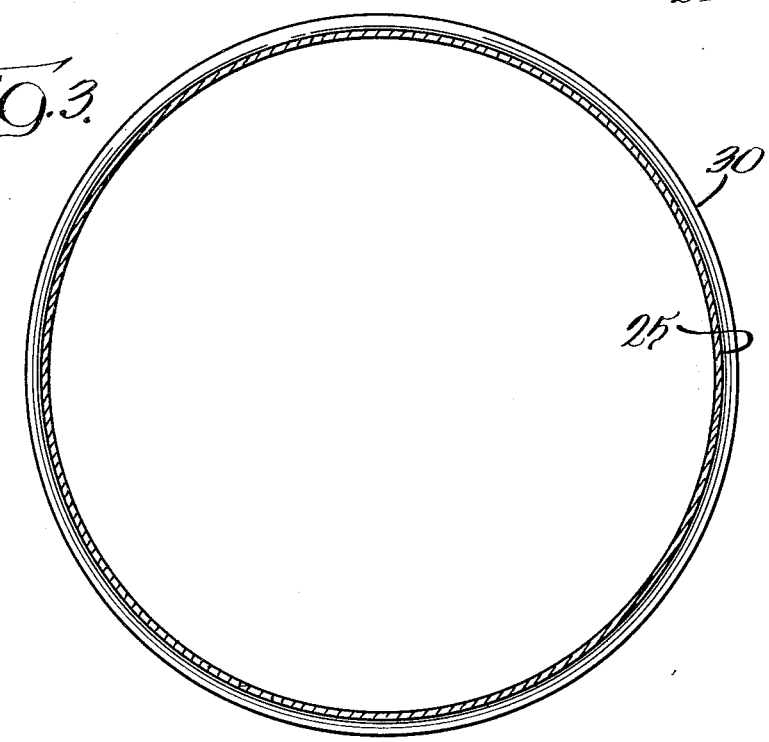
FIG. 3 is a sectional view taken as indicated on line 3—3 of FIG. 2.

Means are provided in the lateral surface 22 for stiffening said surface against pressures transverse to the axis of the container 20, while at the same time affording a sidewall 21 which is readily collapsible under manual axial pressure when the contents of the can is exhausted. The stiffening means enables the use of thinner aluminum material, e.g. 0.0040 inches, thus effecting a savings in valuable material. Generally, the contents filling the container 20 supplements the integrity of the sidewall 21 during storage and prior to use by the consumer. To this end, and as best shown in FIGS. 2, 3 and 4, the lateral surface of the sidewall is preferably provided with a plurality of inwardly directed annuli or circumferential grooves 25 extending peripherally of the sidewall 21. Each annulus 25 is similarly shaped and in axial cross section is arcuately concave, preferably forming an arc of a circle of a radius of approximately 0.150 inches. Each annulus preferably extends to a depth of approximately 0.060 inches.

In peripheral or transverse cross section, each annulus 25 is in the form of an endless curve and, as shown in FIG. 3, preferably is in the shape of a circle having a common center with the radius of the lateral surface of the can 20. Thus, each annulus 25 is similar and preferably extends to a uniform depth into the lateral surface 22 of the sidewall 21; and each annulus extends about the lateral surface 22 in a plane perpendicular to the axis of the can 20.

Adjacent annuli are formed closely together, as indicated in FIGS. 2 and 4, to provide an annular, outwardly angled ridge or rib means 30 between each pair of annuli, the peripheral ridges contributing to the stiffening of the sidewall 21 of the can 20 against forces directed transversely of the axis of the can. The ridges 30 are sharply peaked or angled in axial cross section, as best shown in FIGS. 4–6.

Preferably the vertical spacing between adjacent ridges 30 is varied in accordance with the diameter of the container 20. The ratio between the diameter of the container and the distance between adjacent ridges is preferred to be about as 10:1. However, such ratios in the range of from 6:1 to 14:1 have been found to be acceptable, although performance improves as such ratios approach 10:1.

Preferably adjacent rib means 30 are spaced approximately 0.250 inches when the diameter of can 20 is approximately 2.50 inches. With such can dimensions, and with a depth of each annulus of about 0.060 inches, a hexagonal folding action is afforded, as shown in FIG. 10. As the ratio above is increased, the folding action of annuli tends to form a polygon of more sides than six; and as the ratio is decreased, the folding action of annuli tends to form a polygon of less sides than six. Thus the spacing between adjacent ridges 30 may be increased or decreased to accommodate cans 20 of varying diameters. Likewise the depth and shape in axial cross section of each annulus may be varied as long as the folding action by axial pressure is accomplished as shown in FIGS. 5 and 6.

The initial folding action of the preferred embodiment is illustrated in FIGS. 4–6, the aluminum can being generally in the shape of a right circular cylinder, the transverse cross section of each annulus being substantially in the form of a circle, and the axial cross section of each annulus being an arc of a circle.

When collapsing a can, it is preferred that the can be placed upon a surface which will allow the air pressure within the can to readily escape when axial pressure, e.g., from an individual's foot, is applied. Also, during initial collapse, the annulus 25 near the center of the can will generally be the first to show a folding or collapsing action, which is to be expected since reactive pressure from the supporting surface as well as pressure upon the exposed end of the can is being applied to the container sidewall, as indicated by the arrows in FIGS. 5 and 6.

These opposing pressures or forces set up vector forces 40, 41 in the arcuate axial cross section of the annulus 25 being collapsed as indicated by the arrows in FIG. 5. The two vector forces produce a resultant vector force 42 directed inwardly and transverse of the axis of the can.

Since the transverse cross section of the annulus being collapsed is substantially a circle, and since all points on the circle are tending to be moved inwardly of the can by the resultant vector forces from the axial forces applied, each arc of the circle is tending to be moved toward a shortened chord position of the circle by the resultant forces applied. In other words, each arc portion on the circle is attempting to be moved toward a straight line condition, in much the same way as a toggle device which is passing over center. And, as with the toggle, great endwise forces are produced as the arc portions tend to move toward straight condition. In substance, the annular ring is placed under substantial annular tension by the summation of these annularly applied, resultant vector forces 42.

When the resultant vector forces are applied, adjacent arcuate circular portions of the initial annulus being collapsed fold inwardly (FIG. 5) and seek out and bend the annulus outwardly at the weakest location between the adjacent circular portions to form outwardly projecting apex portions 45. In other words, the circular ring becomes relieved of its annular tension or force by the outward projection of a weakened portion of the annulus to form apex portion 45.

As shown in FIG. 6, annuli above and below the initial annulus being collapsed usually begin their bending or folding action before the complete collapse of the initial annulus.

Continued folding of the annulus 25 of FIG. 5 results in a series of flattened segments or chord-like plates 46, as shown in FIGS. 6 and 7, each of which extend between adjacent apex portions 45 formed in the annulus. Since there is no predetermined locus of weakening to predetermine outward bending in the annulus being collapsed, the segments formed from each of the arcuate circular portions are not always regular and of the same size or length. A kind of polygon of segments is formed but it is not necessarily a regular polygon.

With the complete collapse of the initial annulus into its series of segments 46, a depth of collapsed annuli above and below is quickly established, and successive annuli above and below the initial collapsed annulus are sequentially collapsed upwardly and downwardly by the action of forces as pointed out above until all of the annuli in the sidewall of the can are collapsed and the can is in its collapsed condition as shown in FIGS. 9 and 10.

The apex portions 45 are formed from outwardly distorted portions of each annulus 25. After the collapse of the initial annulus, it is believed that the apex portions of this initial annulus augment the transmission of force to annuli above and below, causing the formation of offset apex portions in these annuli.

Thus, the apex 45 of each interior angle of each polygon formed by each series of segments 46 of a collapsed annulus 25 is not necessarily positioned (and generally is not positioned) directly beneath or above apexes of an adjacent collapsed annulus, as shown in FIGS. 9 and 10. In other words, such apexes are generally heterogeneously arranged in the collapsed can for the reasons pointed out above, and also because adjacent collapsing annuli do not fold into uniform segments. This heterogeneous arrangement of the apexes in each series of segments is desirable because it tends to allow the can to collapse more completely to a minimum height.

Referring to FIG. 11, a diagrammatic illustration is shown for forming the sidewall 21 of the can 20 of the present invention. A pair of cooperating dies 60, 61, each in mandrel form, may be provided for gripping and forming the lateral surface 21 of the can therebetween. Die 60 is the male die, and has a number of rows of annular projections 62 thereon, the exposed surface of each projection 62 being shaped to form an annulus 25.

Die 61 is the female die and has a number of rows of mating cavities 63 in its annular surface, each cavity 63 being shaped to closely receive a projection 62 of die 60 as the dies are turned by rotatable shafts 64 and 65. Die 61 is made smaller than the diameter of the can to permit its retraction from the lateral surface of the can upon completion of the forming operation.

The embossing dies 60, 61 are shaped to provide a shallow and gradual drawing operation on the thin aluminum material to form annuli 25 so that there is no appreciable change in material thickness whereby fracturing problems caused by plastic flow of aluminum are avoided.

It is contemplated within the scope of the present invention that the annuli 25 shown herein may be impressed outwardly of the sidewall 21 of can 20 so that each of the annular rib means 30 is directed inwardly of the container. In other words, the positions of the annuli and rib means are reversed. Since each transverse section of an annulus 25 in this embodiment is arcuately concave outwardly from the lateral surface of the sidewall 21, axial forces through the sidewall above and below an annulus folds the annulus outwardly to form a series of flattened segments each with an outwardly extending free end and each terminating peripherally at an adjacent apex portion.

I claim:

1. A metal container adapted to be axially collapsed when exhausted of its contents, comprising: an endless peripheral metal sidewall generally of right circular cylindrical shape and having open opposite end portions each provided with a closure member to afford an inner chamber for the contents of the container, access to the chamber being provided through one of the closure members, the sidewall being provided with a plurality of similar adjacent annuli each positioned substantially perpendicular to the axis of the container and each of continuous inwardly concave axial cross section and of substantially circular transverse cross section, the annuli extending peripherally of the sidewall between the opposite end portions, adjacent pairs of annuli affording therebetween a continuous outwardly extending substantially circular ridge positioned in a plane substantially perpendicular to the axis of the container, collapsing of the sidewall of the container being effected by manual axial pressure applied endwise of the container to fold each annulus centrally inwardly of its axial cross section as adjacent annuli fold peripherally about an interposed outwardly extending peripheral ridge to form in each annulus a series of inwardly folded segments and spaced apex portions, each segment of the series extending between adjacent apex portions of the series.

2. A seamless aluminum container adapted to be axially collapsed when exhausted of its contents, comprising: an endless peripheral aluminum sidewall generally of right circular cylindrical shape and having open opposite end portions each provided with a closure member to afford an inner chamber for the contents of the container, access to the chamber being provided through one of the closure members, the sidewall being provided with a plurality of similar adjacent annuli each positioned substantially perpendicular to the axis of the container and each of continuous inwardly concave axial cross section and of substantially circular transverse cross section, the annuli extending peripherally of the sidewall between the opposite end portions, adjacent pairs of annuli affording therebetween a continuous outwardly extending substantially circular ridge positioned in a plane substantially perpendicular to the axis of the container, collapsing of the sidewall of the container being effected by manual axial pressure applied endwise of the container to fold each annulus centrally inwardly of its axial cross section as adjacent annuli fold peripherally about an interposed outwardly extending peripheral ridge to form in each annulus a series of inwardly folded segments and spaced apex portions, each segment of the series extending between adjacent apex portions of the series.

3. A container as specified in claim 2, in which each annulus is shaped to form a continuous similar concave arcuate axial cross section.

4. A container as specified in claims 2 or 3, in which the ratio of the diameter of the chamber to the vertical distance between adjacent ridges is approximately as 10:1.

5. A container as specified in claim 4, in which the depth of the concave axial cross section of each annulus is approximately 0.060 inches.

6. A container as specified in claim 3, in which the ratio of the diameter of the chamber to the vertical distance between adjacent ridges is approximately in the range between 9:1 and 12:1.

7. A container as specified in claim 3, in which the diameter of the chamber is approximately 2.50 inches and the vertical distance between adjacent ridges is approximately 0.250 inches.

8. A container as specified in claim 2, in which each apex portion in each annulus is distorted by the inward folding of adjacent segments and is moved in a direction outwardly of the direction of folding of adjacent segments.

9. A container as specified in claim 2, in which each apex portion in each annulus is moved outwardly during the folding of the annuli to provide folded segments adjacent each apex portion in each annulus.

10. A container as specified in claim 2, in which the folded segments and spaced apex portion of adjacent annuli are heterogeneously disposed peripherally of the collapsed sidewall.

11. A container as specified in claim 3, in which the vertical distance between adjacent ridges is in the range of 3/16 inches to ⅜ inches.

12. A container as specified in claim 3, in which the ratio of the diameter of the chamber to the vertical distance between adjacent ridges is in the range of from 6:1 to 14:1.

13. A container as specified in claim 2 in which the axial cross section of each annulus is in the shape of a continuous similar arc of a circle.

14. A container as specified in claim 13 in which the ratio of the diameter of the chamber to the vertical distance between adjacent rdges is approximately in the range between 9:1 and 12:1.

15. A container as specified in claim 13 in which the radius of the arc of the circle is approximately 0.150 inches and the inward depth of said arc in axial cross section is approximately 0.060 inches.

16. A container as specified in claim 16 in which the ratio of the diameter of the chamber to the vertical distance between adjacent ridges is approximately in the range between 9:1 and 12:1.

17. A container as specified in claim 2 in which the axial cross section of each ridge is generally angular in shape.

18. A container as specified in claim 3 in which the inward depth of the axial cross section of each annulus is approximately 0.060 inches.

19. A container as specified in claim 2, in which the spaced apex portions in each series of segments and apex portions are each peripherally angularly offset from the apex portions in an adjacent series of segments and apex portions.

20. A container as specified in claim 2, in which the apex portions formed in each series of segments and apex portions in an annulus are each peripherally angularly offset from the apex portions in an adjacent series, each apex portion of a series formed during collapsing of the container sidewall initiating subsequent central folding of a segment of an adjacent annulus.

21. A container as specified in claim 2, in which each folded segment formed in a collapsed annulus includes an upper layer and a lower layer of aluminum material.

* * * * *

UNITED STATES PATENT AND TRADEMARK OFFICE
CERTIFICATE OF CORRECTION

PATENT NO. : 4,324,340
DATED : April 13, 1982
INVENTOR(S) : Paul Belokin Jr.

It is certified that error appears in the above-identified patent and that said Letters Patent are hereby corrected as shown below:

On the title page of the above patent, under
"REFERENCES CITED U.S. PATENT DOCUMENTS"
"1,517,857" should be -- 1,617,857 --.

On the first page of the above patent, in the "Abstract"
line 12, after "adjacent" insert -- annuli --.

Column 10, line 3, "16" (second occurrence) should be
-- 15 --.

Signed and Sealed this

Thirtieth Day of August 1983

[SEAL]

Attest:

GERALD J. MOSSINGHOFF

Attesting Officer   Commissioner of Patents and Trademarks